No. 737,334. Patented August 25, 1903.

UNITED STATES PATENT OFFICE.

JAMES S. BURNS, OF ANN ARBOR, MICHIGAN, ASSIGNOR OF ONE-THIRD TO GEORGE P. GOODALE, OF DETROIT, MICHIGAN.

COMPOUND FOR ARTIFICIAL STONE.

SPECIFICATION forming part of Letters Patent No. 737,334, dated August 25, 1903.

Application filed February 9, 1903. Serial No. 142,685. (No specimens.)

*To all whom it may concern:*

Be it known that I, JAMES S. BURNS, a citizen of the United States, residing at Ann Arbor, county of Washtenaw, State of Michigan, have invented a certain new and useful Improvement in Compound for Artificial Stone; and I declare the following to be a full, clear, and exact description of the same, such as will enable others skilled in the art to which it pertains to make and use the same.

This invention relates to artificial stone, brick, and building material, and has for its object an artificial-stone compound useful for any purpose for which stone may be used.

In making the stone I employ any of the well-known brands of Portland cement, with sharp silicious sand mixed in the proportions ordinarily used in mixtures of cement and sand, generally about one part of cement to six parts of sand, using in addition to the sand, however, at times marble-dust, which gives the finished product a white glistening appearance and causes it to simulate to a certain extent white marble. The sand and cement are mixed with water in what is known as a "dry" mixture—that is, no more water is used than is sufficient to moisten it thoroughly without bringing it to a creamy or semiliquid or muddy condition. In the water before it is used is dissolved silicate of soda, copperas, litharge, salt, and sulfuric acid in the proportion of about eight (8) pounds of silicate of soda, four (4) pounds of copperas, and five (5) pounds of salt to fifty (50) gallons of water, and in the solution is mixed about two (2) pounds of litharge, which is stirred and kept in suspension while the liquid is using. To this mixture is added forty (40) gallons of water containing one per cent. of sulfuric and one per cent. of hydrofluoric acid. The cement material moistened with the liquid compound is placed in molds, when it may be immediately removed, as it sets at once. It is then allowed to dry, and during the curing is from time to time washed with diluted nitric acid.

The proportions given above are not absolute, but are approximate and may be varied within reasonable limits without serious detriment to the product; but the proportions given have been found to give the best results. Any mineral coloring-matter may be added. The proportions of quantities cannot be given more than approximate, because all of the elements as they are found in nature and in commerce differ more or less. Neither the sand nor the Portland cement are uniform, and allowance must be made because of such want of uniformity. The nitric acid used to wash the product during the process of curing acts to form colloidal silica with the sodium silicate for a short distance in from the surface, producing a chemical reaction with some of the materials and forms a waterproof coating around the stone which extends into the stone for a short distance and prevents the subsequent leaching out of any of the soluble salts therein.

What I claim is—

An artificial stone composed of Portland cement and sand, moistened with water in which have been dissolved silicate of soda, copperas, salt, sulfuric and hydrofluoric acid in the proportions specified, and in which is held in suspension litharge in the proportions specified, the said stone being treated while curing with a wash of diluted nitric acid, substantially as specified.

In testimony whereof I sign this specification in the presence of two witnesses.

JAMES S. BURNS.

Witnesses:
LOTTA LEE HAYTON,
MAY E. KOTT.